(12) United States Patent
Murphy et al.

(10) Patent No.: US 11,983,909 B2
(45) Date of Patent: May 14, 2024

(54) RESPONDING TO MACHINE LEARNING REQUESTS FROM MULTIPLE CLIENTS

(71) Applicant: Hewlett-Packard Development Company, L.P., Spring, TX (US)

(72) Inventors: David Murphy, Palo Alto, CA (US); Thomas da Silva Paula, Porto Alegre (BR); Wagston Tassoni Staehler, Porto Alegre (BR); Joao Edurado Carrion, Porto Alegre (BR); Alexandre Santos da Silva, Jr., Porto Alegre (BR); Juliano Cardoso Vacaro, Porto Alegre (BR); Gabriel Rodrigo De Lima Paz, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 354 days.

(21) Appl. No.: 17/415,867

(22) PCT Filed: Mar. 14, 2019

(86) PCT No.: PCT/US2019/022217
§ 371 (c)(1),
(2) Date: Jun. 18, 2021

(87) PCT Pub. No.: WO2020/185233
PCT Pub. Date: Sep. 17, 2020

(65) Prior Publication Data
US 2022/0076084 A1 Mar. 10, 2022

(51) Int. Cl.
*G06V 10/20* (2022.01)
*G06F 18/40* (2023.01)
(Continued)

(52) U.S. Cl.
CPC ............. *G06V 10/20* (2022.01); *G06F 18/40* (2023.01); *G06N 20/00* (2019.01); *G06V 10/95* (2022.01); *G06F 2218/16* (2023.01)

(58) Field of Classification Search
CPC ......... G06V 10/20; G06V 20/52; G06N 20/00
See application file for complete search history.

(56) References Cited

U.S. PATENT DOCUMENTS

| 9,633,315 | B2 | 4/2017 | Chapelle et al. |
| 10,572,215 | B1 | 2/2020 | Cooper et al. |

(Continued)

FOREIGN PATENT DOCUMENTS

| CN | 106295617 A | 1/2017 |
| CN | 107247990 A | 10/2017 |

OTHER PUBLICATIONS

Buy Custom Built Desktop & Workstation Pcs, Aug. 23, 2018, Antpc.

(Continued)

*Primary Examiner* — Diane D Mizrahi
(74) *Attorney, Agent, or Firm* — Knobbe, Martens, Olson & Bear, LLP

(57) ABSTRACT

A method includes receiving, with a computing device, a first client request from a first client that identifies a machine learning model and a sensor. The method includes sending, with the computing device, a call to a server to apply the identified machine learning model to a set of data from the identified sensor, in response to the first client request. The method includes receiving, with the computing device, a second client request from a second client that identifies a same machine learning model and sensor as the first client request. The method includes sending, with the computing device, response data from the identified machine learning model to both the first client and the second client without (Continued)

sending an additional call to the server in response to the second client request.

15 Claims, 7 Drawing Sheets

(51) Int. Cl.
    *G06N 20/00*     (2019.01)
    *G06V 10/94*     (2022.01)

(56) References Cited

U.S. PATENT DOCUMENTS

| | | |
|---|---|---|
| 10,671,068 B1 | 6/2020 | Xu et al. |
| 2011/0035787 A1 | 2/2011 | Naslund et al. |
| 2013/0031633 A1 | 1/2013 | Honig et al. |
| 2014/0019387 A1 | 1/2014 | Cao et al. |
| 2014/0288874 A1 | 9/2014 | Matsunaga et al. |
| 2015/0170053 A1 | 6/2015 | Miao |
| 2015/0324690 A1 | 11/2015 | Chilimbi et al. |
| 2016/0034809 A1 | 2/2016 | Trenholm et al. |
| 2016/0066860 A1 | 3/2016 | Sternickel et al. |
| 2016/0078361 A1* | 3/2016 | Brueckner ............. H04L 67/10 706/12 |
| 2017/0193390 A1 | 7/2017 | Weston et al. |
| 2017/0220949 A1 | 8/2017 | Feng et al. |
| 2018/0285319 A1 | 10/2018 | Nieuwenhuys et al. |
| 2019/0286153 A1 | 9/2019 | Rankawat et al. |
| 2019/0384304 A1 | 12/2019 | Towal et al. |
| 2020/0193218 A1 | 6/2020 | Liu et al. |
| 2020/0209111 A1 | 7/2020 | Lavid et al. |
| 2020/0210726 A1 | 7/2020 | Yang et al. |
| 2020/0249685 A1 | 8/2020 | Elluswamy et al. |
| 2020/0342968 A1 | 10/2020 | Avinash et al. |
| 2021/0271259 A1 | 9/2021 | Karpathy |

OTHER PUBLICATIONS

Sarthak Jain, How to easily Detect Objects with Deep Learning on Raspberry Pi, retrieved from https://medium.com/nanonets/how-to-easily-detect-objects-with-deep-learning-on-raspberrypi-225f29635c74, Mar. 20, 2018, Nanonets, 24 pages.

Wayde Gilliam , Making a Deep Learning Server, retrieved from https://waydegg.github.io/making-a-dl-server.html, Jul. 6, 2018, 11 pages.

* cited by examiner

RESPONDING TO MACHINE LEARNING REQUESTS FROM MULTIPLE CLIENTS

BACKGROUND

Deep learning is a specialized area of machine learning and artificial intelligence that may be used in different areas, such as computer vision, speech recognition, and text translation. In computer vision, the computer learns how to interpret images to detect persons, and identify objects or scenes.

DETAILED DESCRIPTION

Figure 1:
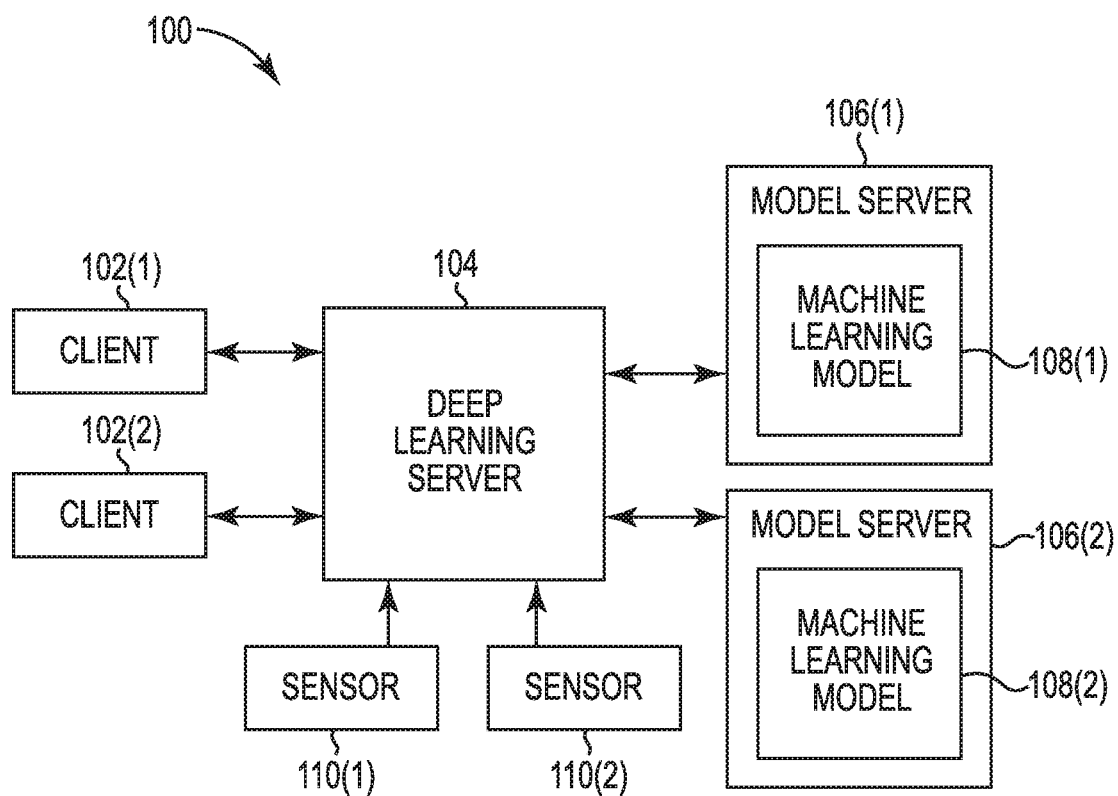
FIG. 1 is a block diagram illustrating a machine learning system including a deep learning server according to one example.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Deep learning is a specialized area of machine learning and artificial intelligence that may be used in different areas, such as computer vision, speech recognition, and text translation. In computer vision, the computer learns how to interpret images to detect persons, and identify objects or scenes. Deep learning models typically use extensive resources like memory and GPU power. Having a simpler client, such as a smartphone, a digital assistant, a robot or even a PC with low-end graphics, to run those models may limit the size, accuracy, and the number of models a user can run at the same time. If the user wants a frame by frame analysis from several video sources, this may be beyond the capabilities of the device.

Even though machine learning/deep learning applications may be deployed in the cloud, some applications have specific issues that motivate local deployment, such as privacy, security, data bandwidth, and real-time low latency decisions. In terms of privacy and security, sometimes there is a concern whether the information leaves the local network of a home (e.g., video or speech of the family) or an office (e.g., videos or speech of sensitive information). Regarding data bandwidth and latency, for the cases that involve processing video streams, sending data from high resolution frames constantly to the cloud involves large bandwidth and makes it difficult to have real-time (or close to real-time) results. The dependency on the external network conditions may result in the inference (and therefore, the decision) not being made in real-time.

Some edge devices may be capable of processing machine learning at the edge. However, such devices may be insufficient if multiple tasks are to be performed. For example, if a user wants to execute object detection, face recognition, and semantic segmentation in multiple camera streams of a house, the edge device might be able to execute one of these tasks, but may not be able to execute all of them. Replicating them indefinitely may become inefficient and cumbersome.

Some examples of this disclosure are directed to a local server, called a deep learning server (DLS), to provide access to several instances of machine learning, and being scalable for more instances. The deep learning server system may include multiple computers. The deep learning server provides an interface through which many clients can request inferences from a plurality of different machine learning models based on sensor data from a plurality of different sensors, without sending data outside the local network, and without depending on bandwidth and latency of an external network service. The deep learning server may have a customizable physical and logical architecture. The deep learning server can monitor several video sources on the local network and notify clients when a prediction or inference over a video source occurs. The deep learning server can connect to several machine learning models running distributed or on the same server, and provides a robust and flexible video preprocessing pipeline, optimizing the resources for several different clients. The clients may involve many different types of devices, including robots, printers, mobile phones, assistants/kiosks, etc.

Some examples of the deep learning server essentially combine client requests for the same machine learning model and the same sensor to improve efficiency. When multiple clients request the same machine learning model over the same data source, the deep learning server identifies that situation and makes a single call to the model server. Some examples of the deep learning server use a configuration file (e.g., a JavaScript Object Notation (JSON) configuration file) to create a pipeline that communicates with the model server and performs preprocessing on sensor data before the data is provided to the machine learning model. Some examples of the deep learning server run on fast HTTP/2 with gRPC protocol with binary data transfers for achieving high frame rates in predictions and inferences. The gRPC protocol is an open source remote procedure call (RPC) protocol that uses HTTP/2 for transport, and protocol buffers as the interface description language.

FIG. 1 is a block diagram illustrating a machine learning system 100 including a deep learning server 104 according to one example. System 100 includes client computing devices 102(1) and 102(2) (collectively referred to as clients 102), deep learning server 104, model servers 106(1) and 106(2) (collectively referred to as model servers 106), and sensors 110(1) and 110(2) (collectively referred to as sensors 110).

Sensors 110 provide sensor data to deep learning server 104. The sensor data may provide an explicit indication of an event occurring (e.g., a door sensor providing an indication that a door has been opened), or the sensor data may be data that can be provided to a machine learning model that is trained to make an inference regarding the data (e.g., a video stream that is analyzed to perform a face detection). The term "machine learning model" as used herein generally refers to a trained machine learning model that has previously undergone a training process and is configured to make inferences from received data. Each of the model servers 106 includes at least one machine learning model 108. The clients 102 may send requests to the deep learning server 104 to monitor certain ones of the sensors 110 and provide the clients 102 with event notifications when those sensors 110 detect an event. The clients 102 may also send requests to the deep learning server 104 to apply a specific one of the machine learning models 108 to the sensor data from a specific one of the sensors 110, and return the results to the clients 102.

Figure 2:
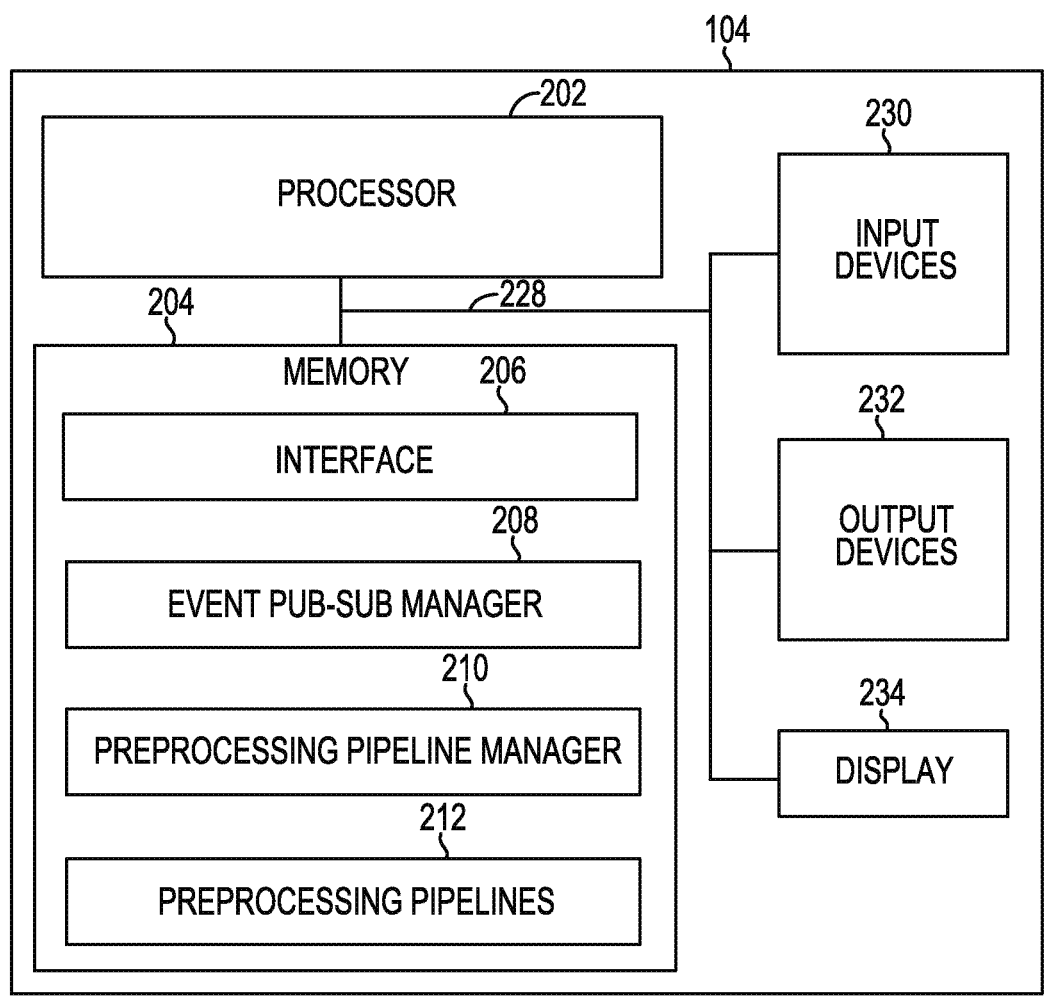
FIG. 2 is a block diagram illustrating elements of the deep learning server shown in FIG. 1 according to one example.

FIG. 2 is a block diagram illustrating elements of the deep learning server 104 shown in FIG. 1 according to one example. Deep learning server 104 includes at least one processor 202, a memory 204, input devices 230, output devices 232, and display 234. In the illustrated example, processor 202, memory 204, input devices 230, output devices 232, and display 234 are communicatively coupled to each other through communication link 228.

Input devices 230 include a keyboard, mouse, data ports, and/or other suitable devices for inputting information into server 104. Output devices 232 include speakers, data ports, and/or other suitable devices for outputting information from server 104. Display 234 may be any type of display device that displays information to a user of server 104.

Processor 202 includes a central processing unit (CPU) or another suitable processor. In one example, memory 204 stores machine readable instructions executed by processor 202 for operating the server 104. Memory 204 includes any suitable combination of volatile and/or non-volatile memory, such as combinations of Random Access Memory (RAM), Read-Only Memory (ROM), flash memory, and/or other suitable memory. These are examples of non-transitory computer readable storage media. The memory 204 is non-transitory in the sense that it does not encompass a transitory signal but instead is made up of at least one memory component to store machine executable instructions for performing techniques described herein.

Memory 204 stores interface module 206, event publication-subscription (pub-sub) manager module 208, preprocessing pipeline manager module 210, and preprocessing pipelines 212. Processor 202 executes instructions of modules 206, 208, and 210, and preprocessing pipelines 212, to perform techniques described herein. It is noted that some or all of the functionality of modules 206, 208, and 210, and preprocessing pipelines 212, may be implemented using cloud computing resources.

Interface module 206 manages communications between the server 104 and the clients 102, and between the server 104 and the model servers 106. Event pub-sub manager module 208 manages subscription requests from clients 102 to subscribe to certain event notifications, and publishes those event notifications to the clients 102. Preprocessing pipeline manager module 210 generates preprocessing pipelines 212 based on received configuration files (e.g., JSON files). The preprocessing pipelines 212 perform preprocessing on sensor data from certain ones of the sensors 110 (FIG. 1) prior to providing the data to the machine learning models 108. The functions performed by modules 206, 208, and 210 are described in further detail below.

In one example, the various subcomponents or elements of the server 104 may be embodied in a plurality of different systems, where different modules may be grouped or distributed across the plurality of different systems. To achieve its desired functionality, server 104 may include various hardware components. Among these hardware components may be a number of processing devices, a number of data storage devices, a number of peripheral device adapters, and a number of network adapters. These hardware components may be interconnected through the use of a number of busses and/or network connections. The processing devices may include a hardware architecture to retrieve executable code from the data storage devices and execute the executable code. The executable code may, when executed by the processing devices, cause the processing devices to implement at least some of the functionality disclosed herein.

Figure 3:
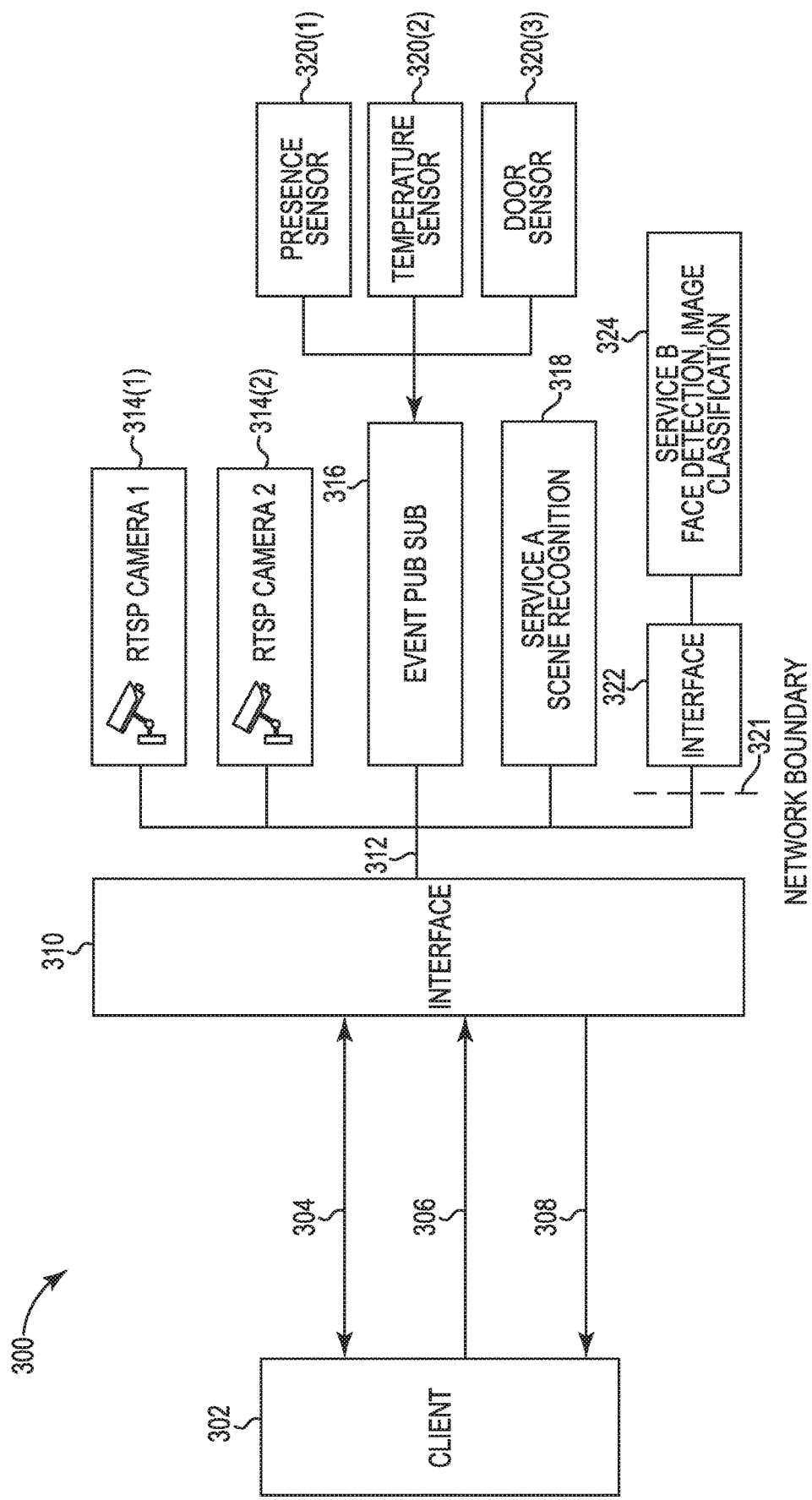
FIG. 3 is a block diagram illustrating an example system implementation of the machine learning system shown in FIG. 1.

FIG. 3 is a block diagram illustrating an example system implementation 300 of the machine learning system 100 shown in FIG. 1. System 300 includes client 302, interface 310, Real Time Streaming Protocol (RTSP) cameras 314(1) and 314(2) (collectively referred to as RTSP cameras 314), event pub-sub manager 316, first machine learning inference service ("Service A") 310, sensors 320(1)-320(3) (collectively referred to as sensors 320), interface 322, and second machine learning inference service ("Service B") 324. Sensors 320 include a presence sensor 320(1), a temperature sensor 320(2), and a door sensor 320(3). The interface 310 is communicatively coupled to the RTSP cameras 314, event pub-sub manager 316, machine learning inference service 318, and interface 322 via communication link 312. RSTP cameras 314 stream video through an RTSP protocol.

In the illustrated example, first machine learning service 318 is a scene recognition service, and second machine learning service 324 is a face detection and image classification service. Dashed line 321 represents a network boundary, indicating that machine learning inference services, such as service 324, may be provided from outside the local network. The other elements shown in FIG. 3 are within the local network. Client 302 corresponds to one of the clients 102 (FIG. 1). Interface 310 corresponds to interface module 206 (FIG. 2). RSTP cameras 314 and sensors 320 correspond to sensors 110 (FIG. 1). Event pub-sub manager 316 corresponds to event pub-sub manager 208 (FIG. 2). Machine learning services 318 and 324 each correspond to one of the model servers 106 (FIG. 1).

The interface 310 accepts connections from clients, such as client 302, using the gRPC protocol. In one example, the client 302 and the interface 310 use standard call/response definitions for inference. The client 302 may ask the interface 310 what machine learning models it serves, and what sensors it can monitor, and the interface 310 will provide responsive information. The client 302 may also ask the interface 310 to monitor a specific sensor using a specific machine learning model and a set of parameters provided by the client 302, and to return detections (e.g., monitor sensor A with model M and return to me all detections with 95% accuracy).

The event pub-sub manager 316 is responsible for notifying client 302 of subscribed events from sensors 320, and from customized rules. When an event is detected by one of the sensors 320, the event pub-sub manager 316 sends an event notification 308, via interface 310, to all of the clients that have subscribed to that event. An event may be, for example, that a person was detected by presence sensor 320(1), or that the temperature sensed by temperature sensor 320(2) raised above a certain threshold, or that a door monitored by door sensor 320(3) was just opened. The client 302 may send a subscription request 306 (e.g., a subscription request for presence detection from presence sensor 320(1)) to the event pub-sub manager 316 via interface 310 to subscribe to a specified event. Events can be simple verifications, like in the case of the temperature, but can also be something that originated after a machine learning inference was calculated. The client 302 may send a subscription request 306 to subscribe to events that originate from any of the sensors 320, as well as events that result from inferences performed by machine learning services 318 and 324, and the interface 310 sends event notifications 308 to the client 302 for all events to which the client 302 has subscribed. This may be accomplished in a publication-subscription manner.

Client 302 may also engage in a bidirectional communication 304 with interface 310, which includes the client 302 sending an inference request to interface 310, and in response, the interface 310 sending inference results to the client 302. In the inference request, the client 302 may identify the video stream from RTSP camera 314(2) (or another camera) and which machine learning inference service 318 or 324 to use, and may also specify that the inference is to fall within certain parameters before the client is to be notified.

In one example, the deep learning server 104 accesses the video streams for specific inference requests and subscribed events via interface 310; captures frames from these video streams; performs preprocessing on the captured frames using preprocessing pipelines 212 (FIG. 2); and sends the preprocessed image data to machine learning inference services 318 and 324 via interface 310 (and interface 322 for service 324). For the sake of efficiency, the same preprocessed frame could be applied to multiple machine learning inference services 318 and 324. In response, the machine learning inference services 318 and 324 apply a machine learning model to the received image data, and send resulting inferences to the interface 310. The deep learning server 104 then sends, via interface 310, inference results to client 302 (and potentially other clients) based on the inferences received from the machine learning inference services 318 and 324.

The interface 310 allows a machine learning model to be served by a machine other than the deep learning server 104. Multiple machines with multiple GPUs can be arranged in a way that, from the point of view of the server 104, the models X, Y and Z are available at a particular IP address and port. Therefore, if more resources are desired, more machines can be added to this topology and more models can be installed on them.

Multiple clients requesting predictions for multiple video streams from remote cameras (e.g. RTSP cameras) using multiple machine learning models, creates some issues, such as: (1) Multiple connections to the same RTSP stream may result in reduced efficiency; (2) multiple clients asking for the same prediction (e.g., image classification) for the same stream may result in reduced efficiency; (3) a single client asking for multiple predictions over the same stream may result in reduced efficiency. Examples of the deep learning server 104 disclosed herein address these issues, including handling multiple clients asking for multiple inferences over multiple video streams by coalescing requests and leveraging model batching to consume computational resources efficiently.

In some examples, the deep learning server 104 may use the same video stream and the same machine learning model for several different clients. For example, a client may connect to the deep learning server 104 and ask for notifications when there is a person in the kitchen. The deep learning server 104 then connects to the kitchen camera and starts monitoring its RTSP stream, and evaluates each frame on a model server with a person detection machine learning model. When a person is detected, the deep learning server 104 notifies that client, and sends back the frame where it occurred. If a second client connects to the deep learning server 104 and asks for person detection on the same camera, the deep learning server 104 may use the same inference result to reply to the second client, since inferences for the given camera are already being made.

Different machine learning models may operate on different types of data. For example, an object detection model may operate on 299×299 images, with three color channels, standardized with a certain standard deviation. A preprocessing pipeline may be used to convert data into a format that is appropriate for a particular machine learning model. Since each machine learning model can involve a different preprocessing, due to its input expectations, the deep learning server 104 provides users with the ability to specify a preprocessing pipeline for any given machine learning model. The process of defining a preprocessing pipeline is described in further detail below with reference to FIG. 4.

Figure 4:
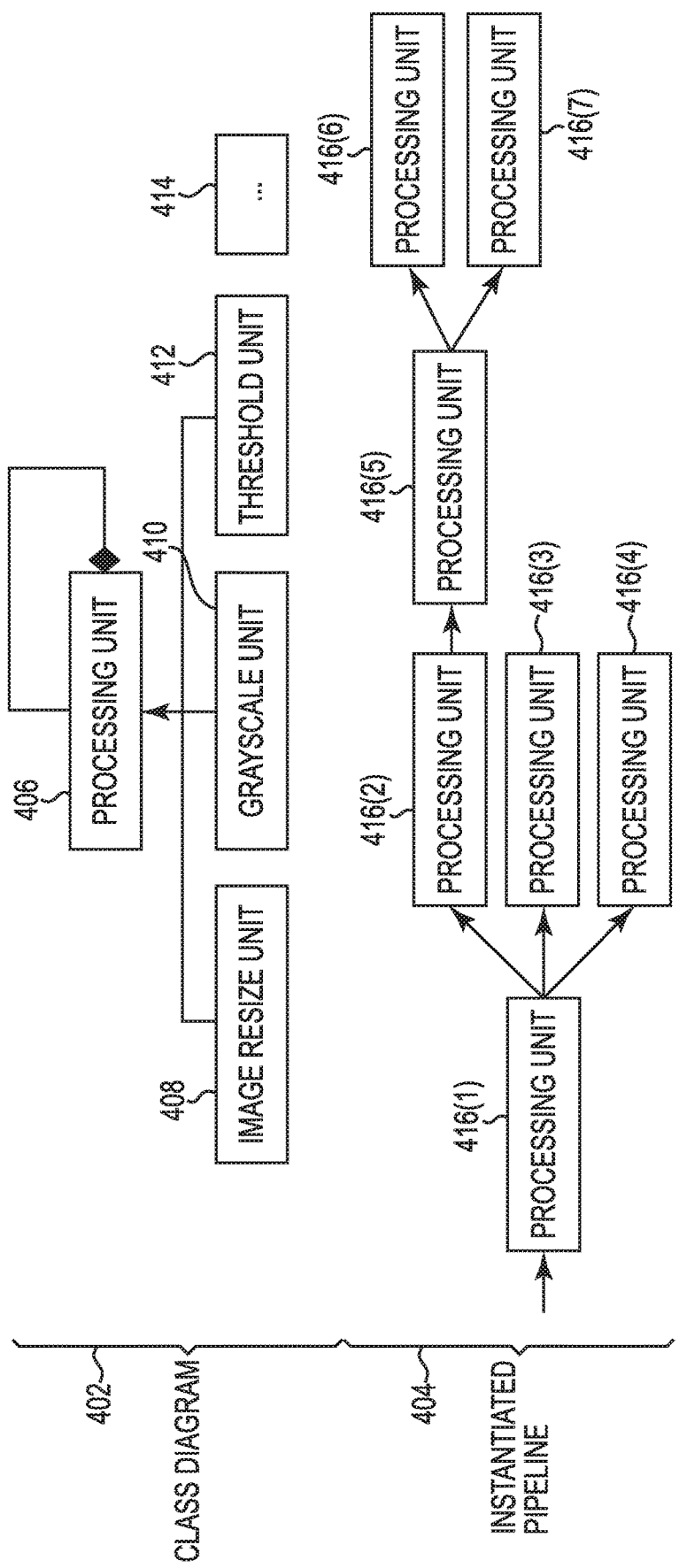
FIG. 4 is a diagram illustrating a preprocessing pipeline according to one example.

FIG. 4 is a diagram illustrating a preprocessing pipeline according to one example. A class diagram 402 of a preprocessing pipeline includes a processing unit abstract class 406 and concrete subclasses 408, 410, 412, and 414. Concrete subclass 408 is an image resize processing unit to resize an image. Concrete subclass 410 is a grayscale processing unit to convert an image to a grayscale image. Concrete subclass 412 is a threshold processing unit to convert an image to a binary threshold image. Concrete subclass 414 is an extra example that indicates that additional concrete subclass may be provided. In one example, the deep learning server 104 includes a set of existing subclasses that a user may use to create a preprocessing pipeline, and also provides the user with the ability to create custom subclasses.

Selected ones of the concrete subclasses 408, 410, 412, and 414 may be instantiated and linked together in a specified manner to generate an instantiated pipeline 404. As shown in FIG. 4, the instantiated pipeline 404 includes processing unit instances 416(1)-416(7) (collectively referred to as processing unit instances 416) that are linked together as shown. Each of the processing unit instances 416 is an instantiation of one of the concrete subclasses 408, 410, 412, and 414. In one example, each of the processing unit instances 416 receives a data vector as input, processes the input data vector, and outputs another vector to all processing unit instances connected to the output of that processing unit instance. Multiple outputs may be generated from a single input. Processing unit instance 416(1) receives input data for the pipeline 404, and processing unit instances 416(6) and 416(7) generate output data for the pipeline 404. The configuration for an instantiated pipeline, such as pipeline 404, may be defined by a configuration file (e.g., a JSON configuration file). The following Pseudocode Example I provides an example of a JSON configuration file for defining a preprocessing pipeline:

---

Pseudocode Example I

{} pipeline_description_template.json
{
  "pipelines": [
    "name": "feeder" ,

Pseudocode Example I

```
"input-channel": "video-stream" ,
"type": "active-feeder" ,
"parameters": [
    {
        "name": "max-threads" ,
        "value": "1"
    },
    {
        "name": "queue-size" ,
        "value": "1"
    }
]
},
{
    "name": "image-feeder" ,
    "type": "image-feeder"
},
{
    "name": "proto-640x480" ,
    "type": "resize" ,
    "parameters": [
        {
            "name": "width"
            "value": "640"
        },
        {
            "name": "height".
            "value": "480"
        }
    ],
    "outputs": [
        {
            "name": "proto" ,
            "type": "tensor-rgb"
        }
    ]
}
]
}
```

Deep learning server 104 may dynamically reuse preprocessing pipelines for multiple clients as long as the clients ask for the same machine learning model over the same sensor data. For example, if three clients ask for an inference over the same video stream, deep learning server 104 may automatically make use of the same pipeline and attach new clients to the end of the pipeline to receive the results from the machine learning model. The preprocessing pipelines make preprocessing more efficient as processing components may be reused and, by decreasing resource utilization via resource sharing, more machine learning inferences may be provided for clients with the same available hardware at the edge. The preprocessing pipelines are also flexible enough to accept different types of data sources, such as audio or video.

Figure 5:
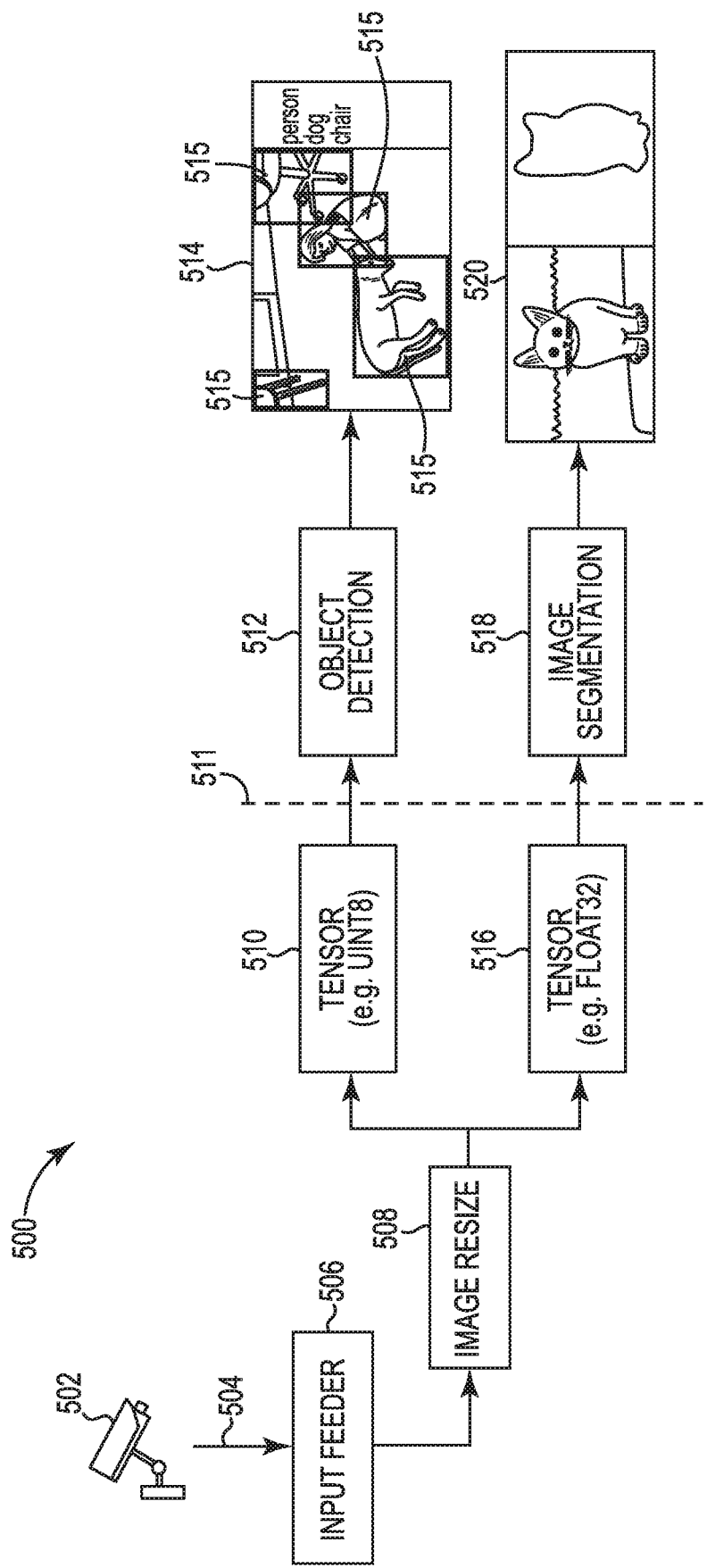
FIG. 5 is a diagram illustrating a preprocessing pipeline to receive a single video stream and preprocess the video stream for two different machine learning models according to one example.

In addition, when there are multiple machine learning models working on the same video stream, but with different preprocessing functions, the deep learning server 104 can handle this situation using the preprocessing pipelines. FIG. 5 is a diagram illustrating a preprocessing pipeline 500 to receive a single video stream and preprocess the video stream for two different machine learning models 512 and 518 according to one example. The preprocessing pipeline 500 includes an input feeder 506, an image resize processing unit 508, a first tensor processing unit 510, and a second tensor processing unit 516. The dashed line 511 represents a boundary between the deep learning server 104 and the model servers for models 512 and 518. In the illustrated example, a single connection to the video stream 504 from camera 502 is provided by input feeder 506, which provides the video stream to image resize processing unit 508. Unit 508 resizes each frame in the received video stream, and then has an output that branches to units 510 and 516 to convert each resized frame to two different types. Each of the machine learning models 512 and 518 has its own specific input format for images. In the illustrated example, unit 510 converts each resized frame to a uint8 type frame for machine learning model 512, and unit 516 converts each resized frame to a float32 type frame for machine learning model 518. Machine learning model 512 is an object detection model that detects objects in received frames, and outputs an image 514 that identifies detected objects 515 (i.e., a person, a dog, and two chairs). Machine learning model 518 is an image segmentation model that segments received frames and outputs a segmented image 520.

Figure 6:
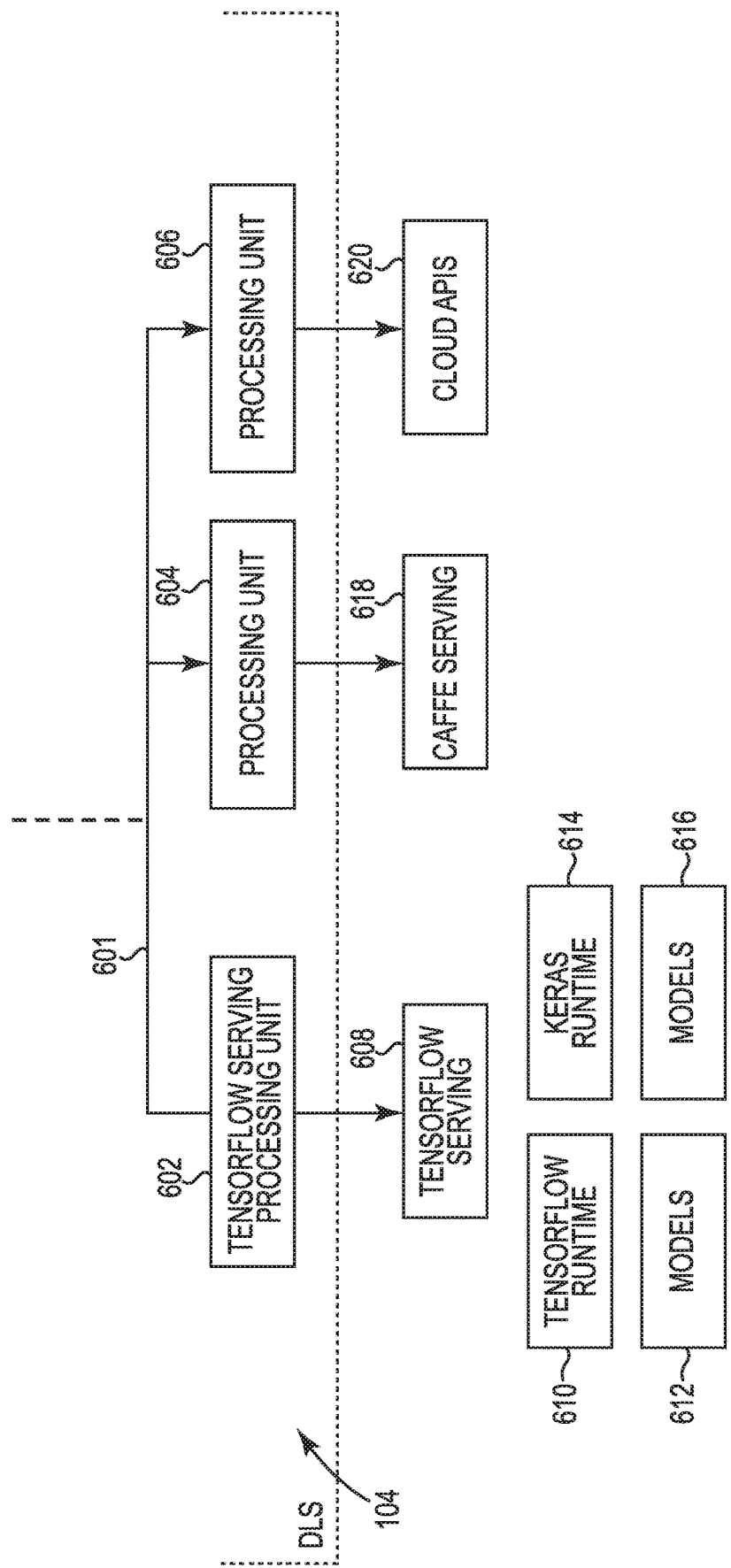
FIG. 6 is a block diagram illustrating elements of the deep learning server coupled to machine learning model servers according to one example.

FIG. 6 is a block diagram illustrating elements of the deep learning server 104 coupled to machine learning model servers according to one example. The deep learning server 104 includes a preprocessing pipeline 601, which includes three processing units 602, 604, and 606 at the end of the pipeline 601.

In the illustrated example, processing unit 602 is a Tensorflow Serving processing unit that is configured to send sensor data and inference requests to a Tensorflow serving model server 608. The Tensorflow serving model server 608 accesses Tensorflow Runtime 610 and machine learning models 612 to provide received sensor data to the models 612, and returns resulting inferences to the Tensorflow Serving processing unit 602. The Tensorflow Serving processing unit 602 may provide inference results to multiple clients. If inferences for a different video stream are requested by a client, a new instance of the Tensorflow Serving processing unit may be created for that video stream.

The Tensorflow serving model server 608 also accesses Keras Runtime 614 and machine learning models 616 to provide received sensor data to the models 616, and returns resulting inferences to the Tensorflow Serving processing unit 602. The Tensorflow Serving processing unit 602 enables the deep learning server 104 to serve Tensorflow and Keras machine learning models, and also any C++ class that implements the Servable interface.

Processing unit 604 is a Caffe serving processing unit that is configured to send sensor data and inference requests to a Caffe serving model server 618. The Caffe serving model server 618 provides received sensor data to machine learning models, and returns resulting inferences to the processing unit 604. Processing unit 606 is a cloud API processing unit that is configured to send sensor data and inference requests to cloud APIs 620. The cloud APIs 620 provide received sensor data to machine learning models, and return resulting inferences to the processing unit 606. The flexibility of the preprocessing pipeline 601 allows any backend to be plugged into the pipeline. Thus, other model serving solutions may be added when they are created.

Deep learning server 104 is a flexible and scalable system with resources to allow the deployment of multiple machine learning models, and includes components to provide efficient management and a communication interface to allow clients to access its features. Some examples disclosed herein provide execution of machine learning methods for edge devices, without the burden and the risks of communicating with the cloud. Some examples of deep learning server 104 provide the following features: (1) Avoid sending private data to the cloud; (2) avoid the issue of setting up a secure connection with the cloud; (3) avoid the dependency on network latency to enable real-time decisions (e.g., for a robot); (4) avoid the cost of high bandwidth to send all the data for some inferences to the cloud; (5) enable machine learning inferences for devices with limited compute resources (e.g., mobile phones, robots, televisions, printers, etc.); (6) manage multiple inference requests and notifications efficiently; (7) enable new applications (e.g., an application where the client requests to be notified of the presence of a person in the front door, in which case, the client points the server to that camera video stream and requests a person detection inference and to be notified of an event); (8) simplify deployment of new inference models; (9) efficient communication infrastructure based on gRPC and HTTP/2; (10) efficient management of multiple data sources, like home/office cameras; and (11) efficient data preparation prior to model inference computation provided by a customizable preprocessing pipelines.

Figure 7:
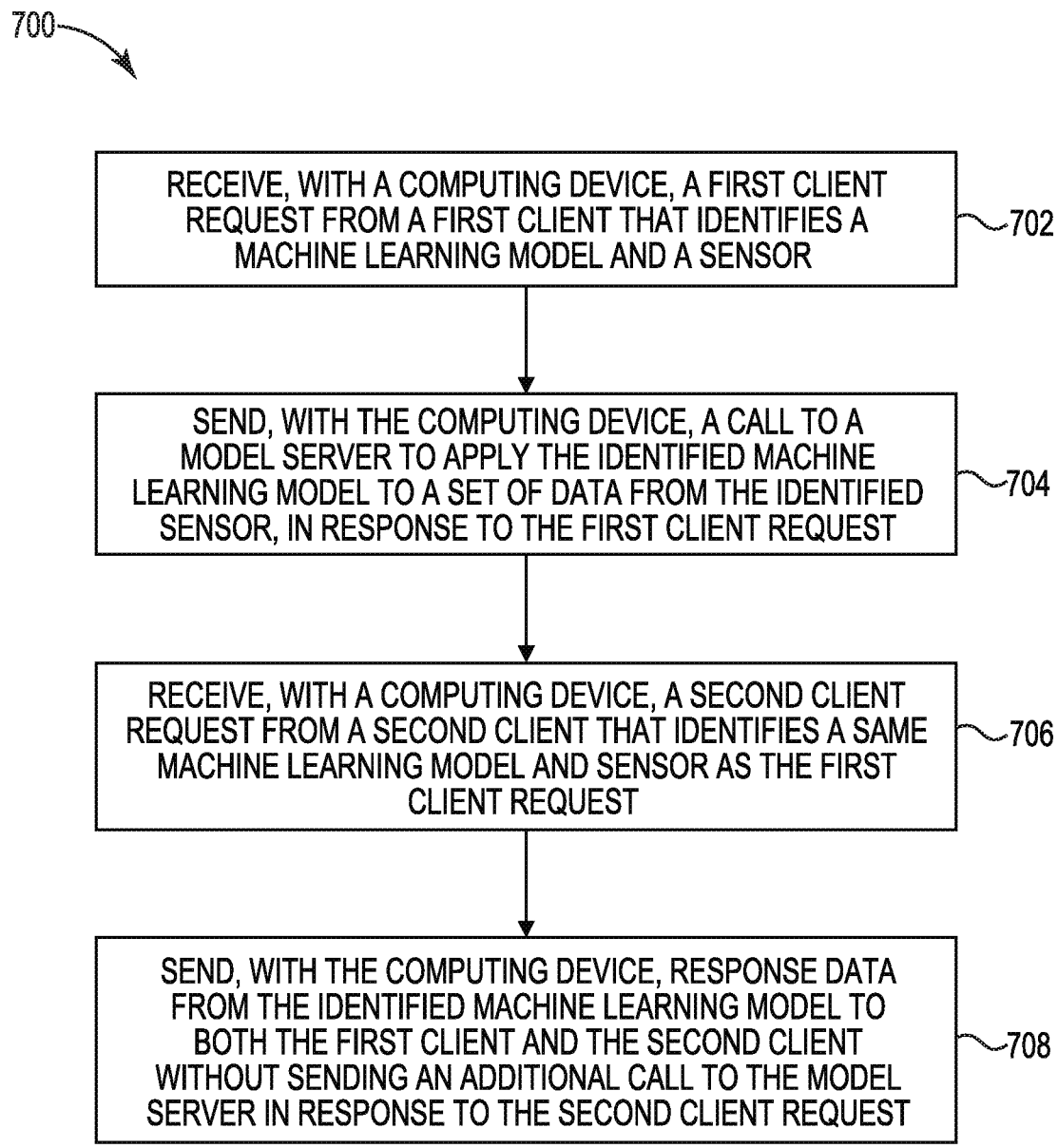
FIG. 7 is a flow diagram illustrating a method of responding to machine learning requests from multiple clients according to one example.

One example of the present disclosure is directed to a method of responding to machine learning requests from multiple clients. FIG. 7 is a flow diagram illustrating a method 700 of responding to machine learning requests from multiple clients according to one example. In one example, deep learning server 104 is configured to perform method 700. At 702 in method 700, a computing device receives a first client request from a first client that identifies a machine learning model and a sensor. At 704, the computing device sends a call to a server to apply the identified machine learning model to a set of data from the identified sensor, in response to the first client request. At 706, the computing device receives a second client request from a second client that identifies a same machine learning model and sensor as the first client request. At 708, the computing device sends response data from the identified machine learning model to both the first client and the second client without sending an additional call to the server in response to the second client request.

Note that the response data that is sent to both the first client and the second client in method 700 may be based on client requests involving partially overlapping intervals of sensor data, and additional response data may be sent to either the first client or the second client. For example, if the sensor generates a video stream, the video stream may be separated into frames, and the first and second client requests may specify partially but not completely overlapping sets of frames. Response data based on the overlapping portion may be reported to both clients, while additional response data based on non-overlapping portions may be reported only to the client that identified those portions.

The method 700 may further include receiving, with the computing device, the set of data from the identified sensor; and performing, with the computing device, preprocessing on the set of data to generate preprocessed data. The method 700 may further include sending, with the computing device, the preprocessed data to the model server to apply the identified machine learning model to the preprocessed data.

The preprocessing on the set of data in method 700 may be performed by a preprocessing pipeline in the computing device, and the preprocessing pipeline may include a plurality of processing units linked together in a manner defined by a configuration file. Each of the processing units may receive an input vector, process the input vector, and output an output vector. A first one of the processing units at a beginning of the preprocessing pipeline may receive the set of data from the identified sensor, and a last one of the processing units at an end of the preprocessing pipeline may communicate with the model server. The last one of the processing units may send the preprocessed data to the model server and receive the response data.

The computing device, the first client, and the second client in method 700 may all be part of a same local network. The model server may be part of the same local network, or not part of the same local network. The identified sensor in method 700 may be a camera sensor and the set of data from the identified sensor may be a video stream.

Another example of the present disclosure is directed to a non-transitory computer-readable storage medium storing instructions that, when executed by a processor, cause the processor to: receive a first machine learning client request from a first client that identifies a machine learning model and a sensor; cause a machine learning model server to apply the identified machine learning model to a set of sensor data from the identified sensor and receive responsive inference data, in response to the first machine learning client request; receive at least one additional machine learning client request from at least one additional client that identifies a same machine learning model and sensor as the first machine learning client request; and send the responsive inference data received in response to the first machine learning client request to both the first client and the at least one additional client.

The non-transitory computer-readable storage medium may further store instructions that, when executed by the processor, further cause the processor to: receive the set of sensor data from the identified sensor; perform preprocessing on the set of sensor data to generate preprocessed data; and send the preprocessed data to the machine learning model server to apply the identified machine learning model to the preprocessed data.

Yet another example of the present disclosure is directed to a system, which includes a server computing device including an interface to receive a first client request from a first client that identifies a machine learning model and a sensor, and a second client request from a second client that identifies a same machine learning model and sensor as the first client request. The system includes a preprocessing pipeline in the server computing device to, in response to the first client request, perform preprocessing on sensor data from the identified sensor to generate preprocessed data, send the preprocessed data to a model server to apply the identified machine learning model to the set of preprocessed data, and receive responsive inference data from the model server. The interface sends the responsive inference data to both the first client and the second client. The preprocessing pipeline may include a plurality of processing units linked together, and each of the processing units may receive an input vector, process the input vector, and output an output vector.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:
1. A method, comprising:
receiving, with a computing device, a first client request from a first client that identifies a machine learning model and a sensor, wherein the machine learning model is an object detection model and wherein the first client request is to identify an object based in part on a set of data from the sensor;

in response to the first client request, sending, with the computing device, a call to a model server to apply the identified machine learning model to the set of data from the sensor to identify an object, wherein the set of data comprises video frames;

receiving, with the computing device, a second client request from a second client that identifies a same machine learning model and sensor as the first client request, the second client different from the first client; and sending, with the computing device, object response data from the identified machine learning model corresponding to the call to both the first client and the second client without sending an additional call to the model server in response to the second client request.

2. The method of claim 1, and further comprising:
receiving, with the computing device, the set of data from the sensor; and
performing, with the computing device, preprocessing on the set of data to generate preprocessed data.

3. The method of claim 2, and further comprising:
sending, with the computing device, the preprocessed data to the model server to apply the identified machine learning model to the preprocessed data.

4. The method of claim 2, wherein the preprocessing on the set of data is performed by a preprocessing pipeline in the computing device, and wherein the preprocessing pipeline includes a plurality of processing units linked together in a manner defined by a configuration file.

5. The method of claim 4, wherein each of the processing units receives an input vector, processes the input vector, and outputs an output vector.

6. The method of claim 4, wherein a first one of the processing units at a beginning of the preprocessing pipeline receives the set of data from the sensor, and a last one of the processing units at an end of the preprocessing pipeline communicates with the model server.

7. The method of claim 6, wherein the last one of the processing units sends the preprocessed data to the model server and receives the response data.

8. The method of claim 1, wherein the computing device, the first client, and the second client are all part of a same local network.

9. The method of claim 8, wherein the model server is part of the same local network.

10. The method of claim 8, wherein the model server is not part of the same local network.

11. The method of claim 1, wherein the sensor is a camera sensor and the set of data from the sensor is the video frames of a video stream.

12. A non-transitory computer-readable storage medium storing instructions that, when executed by a processor, cause the processor to:
receive a first machine learning client request from a first client that identifies a machine learning model and a sensor, wherein the machine learning model is an object detection model and wherein the first client request is to identify an object based in part on a set of data from the sensor;

in response to the first machine learning client request, cause a machine learning model server to apply the identified machine learning model to the set of sensor data from the sensor to identify an object and receive responsive inference data corresponding to the object, wherein the set of data comprises video frames;

receive at least one additional machine learning client request from at least one additional client that identifies a same machine learning model and sensor as the first machine learning client request, the additional client different from the first client; and send the responsive inference data corresponding to the object received in response to the first machine learning client request to both the first client and the at least one additional client.

13. The non-transitory computer-readable storage medium of claim 12 storing instructions that, when executed by the processor, further cause the processor to:
receive the set of sensor data from the sensor;
perform preprocessing on the set of sensor data to generate preprocessed data; and
send the preprocessed data to the machine learning model server to apply the identified machine learning model to the preprocessed data.

14. A system, comprising:
a server computing device including an interface to receive a first client request from a first client to identify an object detection machine learning model and a sensor, the first client request is to identify an object based in part on sensor data, and a second client request from a second client that identifies a same object detection machine learning model and sensor as the first client request, the second client different from the first client; and a preprocessing pipeline in the server computing device to, in response to the first client request, perform preprocessing on the sensor data from the sensor to generate preprocessed data, send the preprocessed data to a model server to apply the identified object detection machine learning model to the preprocessed data to identify the object, and receive responsive inference data corresponding to the object from the model server, wherein the preprocessed data comprises video frames, and wherein the interface sends the responsive inference data to both the first client and the second client.

15. The system of claim 14, wherein the preprocessing pipeline includes a plurality of processing units linked together, and wherein each of the processing units receives an input vector, processes the input vector, and outputs an output vector.

* * * * *